D. N. B. Coffin, Jr.,
Water Filter.

N° 15,646. Patented Sep. 2, 1856.

Witnesses:
Henry B. Osgood.
Sam'l L. Hay.

Inventor:
David N. B. Coffin Jr.

UNITED STATES PATENT OFFICE.

DAVID N. B. COFFIN, JR., OF NEWTON, MASSACHUSETTS.

FILTER.

Specification of Letters Patent No. 15,646, dated September 2, 1856.

*To all whom it may concern:*

Be it known that I, DAVID N. B. COFFIN, Jr., of Newton, in the county of Middlesex and State of Massachusetts, have invented certain new and useful Improvements in Filters for Purifying Fluids; and I do hereby declare that the following is a full, clear, and exact description of the same, reference being had to the accompanying drawings and to the letters of reference marked thereon, which drawings form a part of this specification.

Figure 4:
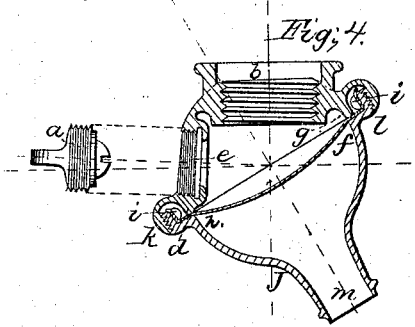
Figure 5:
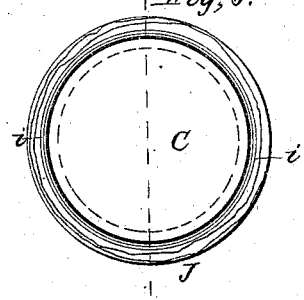
Figure 2:
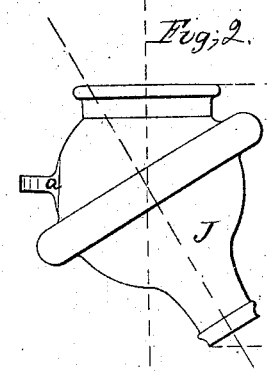
Figure 3:
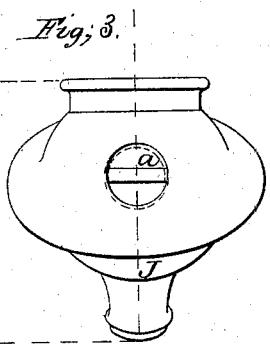
Figure 1:
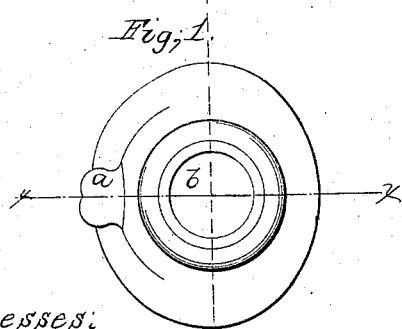
Figure 6:
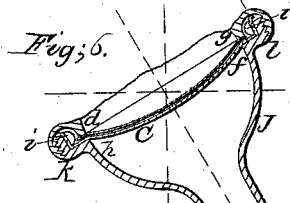

Figure 1 of the drawings is a plan of the filter. Fig. 2 is an elevation. Fig. 3 is an elevation also. Fig. 4 is a section through line $x$, $x$, stopper ($a$) being out and shown separately in elevation. This figure shows my method of applying a single thickness of strong cloth as a filtering diaphragm. Fig. 5 is a plan of the parts of the filter which are below the central joint in which joint the diaphragm is secured. Fig. 6 is to show separately and distinctly my method of applying the one, two or more separate layers of filtering material, such as filtering paper, felted cloth, common cloth, or other similar material, back of and supported mainly by the lower thickness of filtering material, the lower thickness being made of cloth or any other strong and suitable filtering fabric.

The opening ($b$) is for admitting the fluid to be filtered and is provided with a screw by which to attach the filter to the faucet, pipe or other conductor or reservoir.

($c$) represents the filtering diaphragm which is arranged obliquely in relation to the direction of the opening which admits the water, or fluid, so that the current of water when let in will impinge upon the diaphragm obliquely, so as thereby to loosen the impurities which might otherwise adhere to it and also to facilitate the washing them out through the opening ($e$) provided for that purpose. This opening is to be kept closed by a stopper, as ($a$), except that as occasion requires it is opened and the water allowed to pass out there, carrying with it the impurities collected back of the diaphragm. The opening ($e$) is arranged near the part of the diaphragm farthest from ($b$) so as by passing the impinging current of fluid over the whole surface or nearly so the more perfectly to effect this purpose. The diaphragm is represented in Fig. 4, as composed of a single thickness of strong cloth which will be all that is required for many ordinary purposes, but Fig. 6 represents my method of applying several additional layers of filtering material, as before indicated, so as very perfectly to purify the water or other fluid whether it be forced through by a very light or by a heavy pressure. These additional layers composed of filtering paper, felt or cloth or any other similar suitable material are only held between the parts at ($d$) ($h$) ($g$) ($f$) while the lower thickness corresponding to the single diaphragm in Fig. 4 is held firmly by means of the ring ($i$) and the corresponding rabbet in the part ($J$), so as to insure the support of the upper layers to be mainly afforded by the lower one, the lower one being held with greater certainty and strength than they, so that as the pressure of the fluid is increased back of the filtering diaphragm these additional layers are only forced the more closely together and to the lower one, thus counteracting the increase there otherwise would be of the tendency to force impurities through the diaphragm.

The two parts of the body of the filter are jointed together by means of the screw shown at ($k$) ($l$). By means of this screw also the filtering diaphragm is pressed between the parts at ($g$) ($f$) ($d$) ($h$), so that thereby the joint is packed so as effectually to prevent leakage. This method of joining the parts and of applying the filtering diaphragm makes it very easy and convenient to renew the filtering diaphragm as often as desirable, and again as common cloth of a suitable texture and strength will answer the purpose with my improvements nearly or quite as well as any other material it may be renewed at comparatively no cost, as any one can do it with no other tools than a pair of scissors to cut the cloth, and experience proves that this plan of filtering is as effectual and even more so than any other of the more expensive and less convenient methods now in use.

The direction of the spout ($m$) may be vertical if preferred for the looks or other cause. The oblique direction will the more effectually prevent spattering and afford greater convenience in drawing very small quantities.

Figure 7:
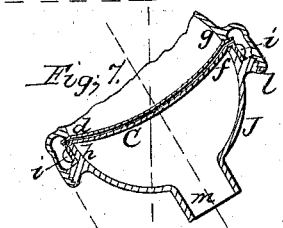

Fig. 7 merely shows the ring (*i*) and rabbet on the outer side of part (J) instead of on the inner as in the other figures.

Like letters indicate the same part in all the figures.

What I claim as my invention and desire to secure by Letters Patent is as follows:

I claim the method substantially as described of applying the filtering diaphragm; and also combining therewith the additional layers as, and for the purposes set forth.

DAVID N. B. COFFIN, Jr.

Witnesses:
 HENRY B. OSGOOD,
 SAML. L. HAY.